:::
United States Patent [19]

Gardiner

[11] Patent Number: 6,071,577
[45] Date of Patent: *Jun. 6, 2000

[54] ADDITIVE FOR IMPROVED THERMAL BONDING BETWEEN DISSIMILAR POLYMERIC LAYERS

[75] Inventor: Eric S. Gardiner, Westtown, N.Y.

[73] Assignee: Arizona Chemical Company, Jacksonville, Fla.

[*] Notice: This patent is subject to a terminal disclaimer.

[21] Appl. No.: 08/888,179

[22] Filed: Jul. 3, 1997

Related U.S. Application Data

[60] Division of application No. 08/445,908, May 22, 1995, Pat. No. 5,679,201, and a continuation-in-part of application No. 08/279,631, Jul. 22, 1994, Pat. No. 5,464,691.

[51] Int. Cl.$^7$ ............................. B29C 27/00; B32B 7/12; C09J 5/00
[52] U.S. Cl. ..................... 428/36.2; 428/349; 428/420; 428/483; 428/501; 428/507; 428/511; 524/287
[58] Field of Search ..................... 428/501, 483, 428/420, 507, 511, 36.2, 349; 524/287

[56] References Cited

U.S. PATENT DOCUMENTS

| | | | |
|---|---|---|---|
| 3,876,452 | 4/1975 | Anspon et al. | 117/76 P |
| 4,042,441 | 8/1977 | Wasserman et al. | 156/306 |
| 4,379,008 | 4/1983 | Gross et al. | 156/69 |
| 4,543,280 | 9/1985 | Fujita et al. | 428/35 |
| 4,604,425 | 8/1986 | Ohmura et al. | 525/88 |
| 4,698,246 | 10/1987 | Gibbons et al. | 428/35 |
| 4,806,399 | 2/1989 | Gibbons et al. | 428/34.2 |
| 4,859,513 | 8/1989 | Gibbons et al. | 428/34.2 |
| 4,871,406 | 10/1989 | Griffith | 156/82 |
| 4,880,701 | 11/1989 | Gibbons et al. | 428/34.2 |
| 4,921,733 | 5/1990 | Gibbons et al. | 428/34.2 |
| 4,929,476 | 5/1990 | Gibbons et al. | 428/34.2 |
| 4,940,612 | 7/1990 | Gibbons et al. | 428/34.2 |
| 4,950,510 | 8/1990 | Massouda | 428/34.2 |
| 4,981,739 | 1/1991 | Gibbons et al. | 428/34.2 |
| 4,983,431 | 1/1991 | Gibbons et al. | 428/34.2 |
| 5,070,143 | 12/1991 | Pucci et al. | 525/74 |
| 5,175,036 | 12/1992 | Smiley et al. | 428/36.7 |
| 5,264,491 | 11/1993 | Quirk | 525/177 |
| 5,272,196 | 12/1993 | Gardiner | 524/252 |
| 5,324,528 | 6/1994 | Wright et al. | 426/324 |
| 5,393,592 | 2/1995 | Jenne | 428/213 |
| 5,464,691 | 11/1995 | Gardiner et al. | 428/336 |
| 5,510,180 | 4/1996 | Liu et al. | 428/332 |
| 5,772,819 | 6/1998 | Olvey | 156/82 |

FOREIGN PATENT DOCUMENTS

| 1587849 | 3/1970 | France | 156/315 |
|---|---|---|---|

OTHER PUBLICATIONS

"Coreactive Polymer Alloys" by M. Lambla, R.X. Yu and S. Lorek in "Multiphase Polymers: Blends and Ionomers" edited by L.A. Utracki and R.A. Weiss, American Chemical Society, 1989.

G.R. DeHoff and T.F. McLaughlin in "Plastics Film Tecnology" by W.R.R. Park, p. 156, Table 6.3, 1969.

*Primary Examiner*—Ellis Robinson
*Assistant Examiner*—Sandra M. Nolan
*Attorney, Agent, or Firm*—Luedeka, Neely & Graham, P.C.

[57] ABSTRACT

The invention relates to a method for thermally bonding dissimilar polymeric layers on a paper or paperboard substrate whereby the bonding strength between the dissimilar polymeric layers is substantially increased. The method utilizes a resin of the structure

A—B—A' wherein each of A and A' is selected from a hydrocarbonous material which is melt compatible with one of the polymeric layers and B is a hydrocarbonous material having characteristics compatible with the other polymeric layer in order to modify the dissimilar polymeric materials in such a manner that there is an increased thermal bonding strength between the dissimilar polymeric materials.

20 Claims, No Drawings

… … …

ADDITIVE FOR IMPROVED THERMAL BONDING BETWEEN DISSIMILAR POLYMERIC LAYERS

This application is a division of application Ser. No. 08/445,908 filed May 22, 1995, now U.S. Pat. No. 5,679,201 issued Oct. 21, 1997, and is a continuation-in-part of application Ser. No. 08/279,631 filed Jul. 22, 1994, now U.S. Pat. No. 5,464,691 issued Nov. 7, 1995.

BACKGROUND

The present invention relates to polymeric coated composites for packaging and, in particular, to methods for improving the thermal bonding between dissimilar polymeric coatings.

Polyolefinic materials such as low density polyethylene (LDPE), polypropylene (PP), polybutylene (PB) and polystyrene (PS) are used in high volumes by the packaging industry as one component of a laminate composite film for coating substrates such as paper, metal foils, nonwoven fabrics and the like. Such polyolefinic materials have substantially non-polar characteristics and thus are not typically well suited for thermal adhesion to polymeric materials having more polar characteristics.

Methods for making polymeric coated paper and paperboard substrates for use as containers and cartons are well known. See for example, U.S. Pat. Nos. 4,698,246; 4,701,360; 4,789,575; 4,806,399; 4,888,222; and 5,002,833.

In many circumstances, it is desirable to use a non-polar polymeric material on one surface of a substrate for a carton or container and a more polar or otherwise dissimilar polymeric material on another surface. During the process of container construction, the finished package often contains an overlap joint. The overlap joint may be bonded with an adhesive, however it is preferable in many cases to thermally seal the joint by mating the two surfaces under heat and pressure so that they are, in effect, fused together. Thermally bonded surfaces offer the potential of providing greater or more uniform bonding strength than other bonding techniques so that fewer joint failures occur. Difficulties often arise, however, when attempting to obtain a strong bond between dissimilar polymeric materials by the use of thermal bonding techniques alone. Adhesives, on the other hand, may not be suitable in many situations, particularly in food or medical applications where contamination of the food or medical materials with the adhesive may occur.

It is therefore an object of the invention to provide an improved polymer coated substrate for packaging.

Another object of the invention is to provide a method for improving the thermal bonding between dissimilar polymeric materials.

A further object of the invention is provide a method for thermally bonding dissimilar polymeric materials on a coated substrate.

A still further object of the invention is to increase the thermal bonding strength between dissimilar polymeric materials without the need to use a separate or discrete polymeric tie layer between the dissimilar polymeric materials.

Another object of the invention is to improve the thermal bonding strength between dissimilar polymeric materials without the need for elaborate or complicated coating techniques.

THE INVENTION

With regard to the foregoing and other objects, the invention provides a method for thermally bonding dissimilar polymeric layers on a paper or paperboard substrate. The method comprises applying to a first surface of the substrate a first layer of polymeric material. A second layer of a dissimilar polymeric material is applied to a second surface of the substrate. Either the first or second layer, or both of them, includes from about 0.5 wt. % to about 10 wt. % of a triblock resin additive of the structure

A—B—A' wherein each of A and A' is selected from a hydrocarbonous material having polymeric characteristics similar to one of the first or second polymeric layers and B is a hydrocarbonous material having polymeric characteristics similar to the other polymeric layer. The first and second coated surfaces of the substrate are then thermally bonded together whereby the bonding strength between the first and second layers is substantially greater than the bonding strength of the same polymeric materials thermally bonded together in the absence of the resin.

As used herein in connection with the polymeric layers the terms, "similar" and "dissimilar" refer principally to the immiscibility of the materials. For example, one polymeric material which exhibits an appreciably different polarity from another polymeric material would generally exhibit appreciable immiscibility in the other polymeric material and, therefore, would not be likely to establish an acceptably strong thermal bond when the two materials are placed in contact and heated to a temperature sufficient to promote thermal bonding. As to the degree of dissimilarity of any two polymeric materials to which the present invention may be applied, those of ordinary skill will appreciate that this is dependent upon whether any two polymeric materials exhibit a sufficiently strong thermal bond in a particular situation based on specific criteria. In those cases where the dissimilar polymeric materials do not exhibit acceptable thermal bonding strength to meet the criteria or requirements, the invention would be expected to find useful application for materially improving the strength of the bond.

The terminology "thermal bonding" and variants thereof as used herein refers to a heating or other application of energy to the respective layers in interfacial contact so as to attempt to induce an infusion, migration or intermingling of mass between the polymeric layers at the interface. For example, sufficient heat energy may be applied to cause one or both of the materials to flow and therefore promote mass transfer of the materials one into the other, and this transfer is often assisted by application of pressure. The process may occur as in a "wetting" of the surface of one material which remains essentially solid while the other has been rendered flowable by heat energy. This infusion, migration or intermingling is promoted to a significant degree by the use of the triblock additive of the invention which promotes a locking together of the layers without the need for a separate tie layer.

According to another aspect of the invention, substrate surfaces coated with dissimilar polymeric materials may now be thermally joined or bonded together without the need for use of relatively expensive adhesives or high molecular weight polymeric tie layers. Furthermore, the thermally bonded surfaces have a strength which is sufficient to significantly reduce the number and frequency of joint failures in polymeric coated paperboard products. These and other advantages of the invention may be obtained by either coating or admixing the resin disclosed herein with one of the polymeric coatings, preferably admixing the resin with the polymeric coating which is to be surface wet by the other polymeric coating, then thermally bonding the two coated surfaces, one to the other. In many cases, the resin is admixed with the higher melting polymeric coating, as this coating will typically be wet by the lower melting polymeric coating.

In one of its embodiments, the invention provides a method for forming an improved heat sealable coated substrate. The method comprises admixing a first polymeric material with from about 0.05 to about 10% by weight of an amphiphilic resin of the structure

A—B—A' wherein each of A and A' is an essentially non-polar hydrocarbonous group and B is an essentially polar group derived from a telechelic diol. The mixture of amphiphilic resin and first polymeric material is applied to a first surface of a substrate. A second surface of the substrate is coated with a second polymeric material which is dissimilar to the first polymeric material. Finally, the first and second coated surfaces are thermally bonded together whereby the bonding strength between the first and second coated surfaces is substantially greater than the bonding strength of the same coated surfaces bonded under the same condition but without the amphiphilic resin.

In yet another embodiment, the invention provides a method for thermally bonding a first surface of a substrate coated with a substantially non-polar polymeric material to a second surface of the substrate coated with a polar polymeric material. The method comprises increasing the bonding activity of the surface of the second polymeric material by use of a resin of the structure

A—B—A' wherein each of A and A' is selected from an essentially non-polar hydrocarbonous group and B is an essentially polar hydrocarbonous group whereby the bonding strength between the first and second coated surfaces of the substrate is substantially greater than the bonding strength of the same coated surfaces in the absence of the resin.

Again, the dissimilar polymeric materials are materials which, by nature, do not thermally bond to each other according to the criteria required for a particular application. In general terms, the dissimilar polymeric materials may be described as polar or non-polar materials, however, this terminology is used in a relative, rather than in an absolute sense. The dissimilar polymeric materials may also be described in terms of their relative surface energies. One polymeric material may have a surface energy of greater than about 40 dynes/cm$^2$ and the other material may have a surface energy of less than about 40 dynes/cm$^2$. The dissimilar polymeric materials may also be described as materials which oppose surface wetting one to the other under conditions wherein one or both of the materials is in molten form. Regardless of the terminology used to characterize the dissimilar polymeric materials, the present invention provides a means for improving a thermal bond between substrates coated with such dissimilar polymeric materials.

One class of polymeric material to which the invention may apply, referred to generally as non-polar polymeric materials, includes polyolefinic materials selected from polyethylene (PE), polypropylene (PP), alpha-olefin modified polyethylene and polypropylene, polybutylene (PB), polystyrene (PS), poly(4-methyl 1-pentene), or mixtures of two or more of the foregoing. A particularly useful application of the invention is in respect to PE or PP, and in particular, low density polyethylene (LDPE).

The amount of substantially non-polar polymeric material applied to one surface of the substrate may range from about 5 to about 15 pounds per 3000 square feet of substrate. The coating may be a single coating of non-polar polymeric material, it may be a plurality of individual coatings totalling the about 5 to about 15 pounds per 3000 square feet of substrate, or it may be one of a plurality of polymeric coatings and adhesives or tie layers provided the non-polar polymeric material is the exposed surface coating on the substrate.

A polymeric layer composed of a thermoplastic material having a polarity substantially greater than the non-polar material is applied to an opposing surface of the paper or paperboard substrate that is to be bonded to the non-polar coated surface. As noted herein, the absolute polarities of the so called "non-polar" and "more polar" polymeric layers are not critical to the invention, provided there is a sufficient difference in polarity to adversely affect the thermal bonding characteristics between the dissimilar polymers in the absence of the resin described herein.

As with the first coating, the amount of more polar coating applied to the opposing surface of the substrate may range from about 5 to about 15 pounds per 3000 square feet of substrate and may be applied as a single coating, as a plurality of coatings, or as one of a plurality of polymeric coatings and adhesives or tie layers provided it is the exposed surface coating on the surface of the substrate.

The more polar polymeric material is typically a polymeric material containing polar substituents or containing groups having electron withdrawing or electron donating characteristics. Accordingly, the more polar polymeric material may include polyamides such as nylon, polyesters such as polyethylene terephthalate (PET), polybutylene terephthalate (PBT) and glycol modified polyethylene terephthalate (PETG), polyvinyl- and vinylidene halides such as polyvinylidene chloride and polyvinyl chloride, polycarbonate (PC) and polyolefinic alcohols such as poly(ethylene-co-vinyl alcohol) (EVOH). Particularly preferred coatings for food packaging applications are PET and EVOH. A widely used EVOH polymeric material is sold under the trade name EVAL EP by the Kuraray Co. Ltd. of Osaka, Japan and a widely used PET polymeric material is KODA-PAK 12440 PET which is available from Eastman Chemical Products Inc., of Kingsport, Tenn. Among the available PC polymeric materials is LEXAN 104–111 resin which is available from The General Electric Company of Schenectady, N.Y.

Methods for coating the substrate with the polymeric materials are well known. Such methods include brushing the layers on the substrate as well as roll, rod, doctor blade, spray coating or extrusion coating methods.

Prior to, essentially simultaneously with or subsequent to coating the substrate surfaces with the dissimilar polymeric materials an amphiphilic resin of the structure

A—B—A' wherein each of A and A' is selected from an essentially non-polar hydrocarbonous group and B is an essentially polar group derived from a telechelic diol, is incorporated within at least one of the coatings. Thus, the amphiphilic resin may be admixed and co-applied with at least one of the polymeric layers or it may be applied in a separate coating step to one or both of the polymeric layers after the polymeric layers have been applied to the substrate.

For application of the amphiphilic resin to the one or both of the polymeric coated surfaces, the amphiphilic resin may first be dissolved in a solvent such as tetrahydrofuran (THF).

The particular solvent is not believed to be critical to the invention. Accordingly, any solvent which forms a liquid dispersion or single phase solution or mixture with the amphiphilic resin may be used. Suitable solvents are those having solvating power for both blocks of the copolymer and having a relatively high volatility such as acetone, chloroform, ethylacetate, methyl ethyl ketone, and the like.

The amount of amphiphilic resin in the solvent may range from about 0.5 to about 10% by weight, with about 1% by weight being preferred for most coating methods. The solution concentration may readily be adjusted to provide a sub-micrometer thickness of amphiphilic resin on one or both of the polymeric coated surfaces.

In an alternative embodiment, the amphiphilic resin is admixed with the polymeric material and co-applied onto the substrate. Preferably, the amphiphilic resin is admixed with the higher melting polymeric material so that when the material cools, a portion of the resin migrates to the surface of the polymeric material thereby modifying its surface properties to the extent that the bonding activity of the polymeric material is substantially increased. Under thermal bonding conditions, the lower melting polymeric material will interact with the A or B blocks of the resin thereby wetting and bonding to an increased degree with the surface of the higher melting material.

The amount of amphiphilic resin admixed with the polymeric material may vary depending on the particular amphiphilic resin and the polymeric material's molecular weight and crystallinity. For most applications, a suitable amount of amphiphilic resin is in the range of from about 0.5 to about 5% by weight, most preferably from about 1 to about 2% by weight.

Methods for producing the admixture of polymeric material and amphiphilic resin are well known. Accordingly, the amphiphilic resin may be admixed with the polymeric material by melt blending the two components, blending two solutions containing the polymeric material and amphiphilic resin, blending the two components in a high shear mixer, or adding the amphiphilic resin as a solid or liquid to the polymeric material during application to the substrate. Melt blending of the amphiphilic resin and higher melting polymeric material may be accomplished, for example, in a thermostatted mixer or compounding extruder. Alternatively, the amphiphilic resin may be added to the polymeric material during work-up immediately after polymerization. The order in which the two components is mixed is not believed to be critical to the invention. Accordingly, the amphiphilic resin may be added to the polymeric material or the polymeric material may be added to the amphiphilic resin.

A preferred amphiphilic resin is a compound of the formula

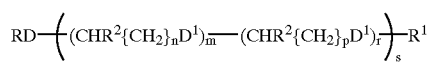

$$RD-\left[(CHR^2\{CH_2\}_nD^1)_{\overline{m}}-(CHR^2\{CH_2\}_pD^1)_r\right]_s-R^1$$

wherein each of R and $R^1$ is selected from the group consisting of alkyl, aryl, alkylaryl groups and, acyl and arylacyl derivatives of an aliphatic or aliphatic/aromatic mono-acid with a molecular weight of from about 200 to about 500 daltons each of D and $D^1$ is selected from O, $-NR^3-$, S and $CO_2$; each of $R^2$ and $R^3$ is selected from the group consisting of H, $CH_3$ and $C_2H_5$; each of n and p is and integer from 0 to 8, provided when p=0, n is greater than 0; each of m and r is an integer selected from 0 to 20, provided when r=0, m is greater than 0; and s is an integer from 1 to 20.

Examples of alkyl, aryl, alkylaryl groups and, acyl and arylacyl derivatives of an aliphatic or aliphatic/aromatic mono-acid with molecular weights of from about 200 to about 500 daltons include, but are not limited to, alkylbenzenes, aliphatic alcohols, acyl derivatives of saturated fatty acids having carbon atom chain lengths of from about 10 to 26 atoms, soya and tall oil fatty acids, alkylbenzoic acids and tall oil, wood and gum rosin acids, and the like.

In a more preferred amphiphilic resin, R and $R^1$ are the same and are most preferably lipophilic rosin; $R^2$ is hydrogen; D and D' are $CO_2$; n is 5; and m is 1; r is 0; and s is an integer from 1 to 20. In another preferred amphiphilic resin, R and $R^1$ are the same and are most preferably lipophilic rosin; $R^2$ is hydrogen; D and D' are $CO_2$; m, n and r are 1; p is 3; and s is an integer from 1 to 20, most preferably 9. In yet another preferred amphiphilic resin, R and $R^1$ are the same and are most preferably lipophilic rosin; $R^2$ is hydrogen; D and D' are $CO_2$; m, n, p and r are 1; and s is an integer from 1 to 20. Particularly preferred amphiphilic resins include a rosin/polycaprolactone (PCL) triblock, a rosin/poly(ethylene adipate) (PEA) triblock and a rosin/poly(ethylene succinate) (PES) triblock.

The amphiphilic resin may be formed by the reaction of polyglycols, polyimines, polyesters or polysulfides with hydrophobic compounds such as fatty acids, rosin acids, alkylphenols or aryl or aliphatic alcohols. The chain length of the hydrophilic segment, polyethylene glycol, for example, may be from 2 to 20 units (where a unit is composed of 1, 2, 3 or 4 carbon atoms and one polar group, i.e. an oxygen, nitrogen or sulfur atoms or carboxyl group) with a preferred length of about 9 units. The hydrophilic or lipophilic groups may have chain lengths of from about 10 to about 26 carbon atoms. The preferred aromatic, aliphatic or mixed alcohols generally have molecular weights from about 200 to about 500 daltons.

The increase in thermal bonding strength between the first and second coated surfaces may be determined by comparing the surface activity of unmodified polymeric layers, such as polyethylene terephthalate, against the activity of the admixture of amphiphilic resin and polymeric material, such as obtained from applying the admixture of polyethylene terephthalate and amphiphilic resin described herein to a substrate. The thermal bonding strength may also be determined by measuring the T-peel strength required to separate the first coated surface from the second coated surface. In the T-peel measurement, a layer of polyolefinic material is applied to the first surface of a substrate such as paperboard. The more polar polymeric material is applied to a second surface of the substrate. Next, a coating of amphiphilic resin is applied to one or both of the first and second coated surfaces. Prior to thermally bonding the two surfaces, the amphiphilic coating may be energized by flame treatment, infra-red heating, forced hot air heating, laser heating or the like. The energization of the amphiphilic coating should be sufficient to partially melt the polymeric surface coated with the amphiphilic resin and provide interdiffusion of the amphiphilic resin into the polymeric material.

Heat and pressure are then applied to the physically interfaced first and second coated substrates to form a bond between the two coated surfaces. The amount of force (measured in lb/in.) needed to peel the second coated surface away from the first coated surface at an angle of 90° is called the T-peel strength.

While the foregoing description generally relates to the formation of coated substrates containing a single coating of each polymeric material on the first and second surfaces, the coated substrate may contain any number of sub-coatings provided it contains at least one external coating comprising a non-polar polyolefinic material and at least one external coating composed of a more polar material than the first coating with an amphiphilic resin available or applied at the physical interface between the coatings to enhance the thermal bonding characteristics between the two coated surfaces.

Any reference herein to coating or otherwise applying the non-polar and/or more polar coatings on a first or second surface of the substrate will be understood to include applying the coatings to underlying coatings which themselves are applied to the substrate or to one or more other coatings one of which is applied to the substrate. Also, it is within the scope of the invention that the first and second surfaces of the substrate may be on both or only one side of the substrate, such as in different sections on one side. For example, the first surface may be part of one surface of the sheet and the second surface may be another part of the same surface of the sheet, with these surfaces being discrete areas or patterns on the sheet in terms of the coatings which are coplanar but physically separate. When the sheet is folded or assembled into a final carton as in liquid food packing, these areas may be brought into contact for thermal bonding.

In order to provide a further understanding of the present invention the following examples are given to illustrate, but not to limit the invention. Examples 1–3 illustrate methods for preparing various amphiphilic resins which may be used to thermally bond dissimilar polymeric materials. The general procedure for preparing various amphiphilic resins is given in U.S. Pat. No. 5,272,196 to Gardiner, incorporated herein by reference as if fully set forth.

EXAMPLE 1

An amphiphilic resin was prepared by the esterification of tall oil rosin (320 grams, 1.1 mols) with poly(caprolactone) diol (415 grams, 0.5 mols) (TONE 201, Union Carbide, molecular weight of 830). Two equivalent weight of the poly(caprolactone) diol were reacted with the tall oil rosin, in the presence of 2.7 grams (40 mmols) hypophosphorous acid catalyst at 260° C. for 20 hours. The reaction was carried out under a nitrogen blanket with stirring and an exit condenser to condense and remove water formed during the esterification step. The resulting amphiphilic resin had an acid number of 20 mg KOH/g of product and a Gardner color of 5 (molten color). The amphiphilic resin was a viscous liquid produced in 95% yield having the general structure:

$$\text{Rosin}-\{(CH_2)_5CO_2\}_n-\text{Rosin}$$

EXAMPLE 2

An amphiphilic resin was prepared by the esterification of tall oil rosin (320 grams, 1.1 mols) with poly(ethylene adipate)diol (500 grams, 0.5 mols) (DESMOPHEN 2500, Bayer Corporation, molecular weight of 1000). Two equivalent weight of the poly(ethylene adipate)diol were reacted with the tall oil rosin in the presence of 2.7 grams (40 mmols) hypophosphorous acid catalyst at 60° C. for 20 hours. The reaction was carried out under a nitrogen blanket with stirring and an exit condenser to condense and remove water formed during the esterification step. The resulting amphiphilic resin had an acid number of 18 mg KOH/g of product and a Gardner color of 5 (molten color). The amphiphilic resin was a viscous liquid produced in 95% yield having the genreral structure:

$$\text{Rosin}-\{(CH_2)_2CO_2-(CH_2)_4CO_2\}_n-\text{Rosin}$$

EXAMPLE 3

An amphiphilic resin was prepared by the esterification of tall oil fatty acid (TOFA) (282 grams) (Acintol EPG tall Oil fatty acid, Arizona Chemical Company) with poly (caprolactone)diol (415 grams, 0.5 mols) (TONE 20, Union Carbide, molecular weight of 830). Two equivalent weight of the poly(caprolactone)diol were reacted with the tall oil fatty acid, in the presence of 2.7 grams (40 mmols) phosphoric acid catalyst at 220° C. for 20 hours. The reaction was carried out under a nitrogen blanket with stirring and an exit condenser to condense and remove water formed during the esterification step. The resulting amphiphilic resin had an acid number of 12 mg KOH/g of product and a Gardner color of 2. The amphiphilic resin was a viscous liquid produced in 95% yield having the general structure:

$$\text{TOFA}-\{(CH_2)_5CO_2\}_n-\text{TOFA}.$$

Examples 4 and 5 illustrate the increase in thermal bonding strength between dissimilar polymeric coated substrates containing the amphiphilic resin of the invention.

EXAMPLE 4

To demonstrate the increased thermal bonding strength between first and second coated surfaces of a paperboard substrate, International Paper Juice Carton board was used as a test sample. The board was extrusion coated with PE on one surface of the paperboard and PET on the opposite surface of the paperboard. A 1% by weight solution of an amphiphilic resin similar to the resin of Examples 1 and 2 in tetrahydrofuran (THF) was coated onto the surface of the PET. The solution was allowed to dry 1 hour at about 23° C. to insure removal of all of the THF solvent. Next the amphiphilic resin coated surface was flame treated simultaneously with the PE coated surface by passing the coated board sample rapidly through a natural gas flame (Fisher Burner), seven to eight times. The flame-treated surfaces were mated and pressure applied with a soft-rubber roller (Shore A hardness of 60 to 80) against a glass plate. The pressure applied was sufficient to intimately mate the surfaces without compressing the substrate.

The strength of the thermal bond was tested by separating the two pieces at a separation rate of 12 inches (30.5 cm) per minute at an angle of 90° (T-peel) according to ASTM D1876-93). The strength improvement was typified by both an increase in the maximum peel value and an increase in total energy to failure as compared to a control which was prepared in exactly the same manner but without the resin additive. More importantly, the substrate failed before the bond between the surfaces failed. The results are given in Table 1.

TABLE 1

| Sample | Maximum Peel (lb/in.) | Total Energy at Break (lb/in.) | Failure Mode |
|---|---|---|---|
| Uncoated control | 1.92 | 1.09 | interfacial[1] |
| Coated with 1 wt. % PCL[3] solution | 2.16 | 1.44 | fiber tear[2] |

TABLE 1-continued

| Sample | Maximum Peel (lb/in.) | Total Energy at Break (lb/in.) | Failure Mode |
|---|---|---|---|
| Coated with 1 wt. % PEA[4] solution | 2.67 | 1.79 | fiber tear |

[1]interfacial = failure between two pieces of laminate
[2]fiber tear = failure in laminate structure within paperboard, usually at PET/paper interface
[3]PCL = rosin/polycaprolactone triblock resin
[4]PEA = rosin/poly(ethylene adipate) triblock resin

EXAMPLE 5

The increased thermal bonding strength between PE and EVOH first and second coated surfaces of a paperboard substrate was demonstrated using International Paper Juice Carton board as a test sample. The board was extrusion coated with PE on one surface of the paperboard and EVOH on the opposite surface of the paperboard. A 1% by weight solution of an amphiphilic resin similar to the resin of Examples 1 and 2 in tetrahydrofuran (THF) was coated onto the surface containing the EVOH. The solution was allowed to dry 1 hour at about 23° C. to insure removal of all of the THF solvent. Next the amphiphilic resin coated surface was flame treated simultaneously with the PE surface by passing the coated board sample rapidly through a natural gas flame (Fisher Burner), seven to eight times. The flame-treated surfaces were mated and pressure applied with a soft-rubber roller (Shore A hardness of 60 to 80) against a glass plate. The pressure applied was sufficient to intimately mate the surfaces without compressing the substrate.

The strength of the thermal bond was tested by separating at a separation rate of 12 inches (30.5 cm) per minute at an angle of 90° (T-peel) according to ASTM D1876-93). The strength improvement was typified by both an increase in the maximum peel value and an increase in total energy to failure as compared to a control prepared in the same manner but without the resin additive. The results are given in Table 2.

TABLE 2

| Sample | Maximum Peel (lb/in.) | Total Energy at Break (lb/in.) | Failure Mode |
|---|---|---|---|
| Uncoated control | 0.47 | 0.06 | interfacial[1] |
| Coated with 1 wt. % PCL[2] solution | 1.05 | 0.12 | interfacial |
| Coated with 1 wt. % PEA[3] solution | 1.68 | 0.14 | interfacial |

[1]interfacial = failure between two pieces of laminate
[2]PCL = rosin/polycaprolactone tri-block resin
[3]PEA = rosin/poly(ethylene adipate) tri-block resin From Tables 1 and 2, it can be seen that the T-peel strength between the PE and PEA/PET coated substrates was about 40% greater than the PE/PET coated control sample and the strength between the PE and PEA/EVOH coated substrates was 257% greater than the PE/EVOH coated control sample. Likewise, the T-peel strength between the PE and PCL coated substrates was about 12.5% greater than the PE/PET coated control sample and the strength between the PE and PCL/EVOH coated substrates was 123% greater than the PE/EVOH coated control sample. It is believed that the increase in bond strength may lead to greater package integrity, reduced failure rates, and allow the seam to contribute structural strength in load bearing applications.

Since topical application of the triblock resin may not be practical or desirable in all manufacturing processes, the surface energy change of an admixture of PET and the PCL or PEA triblock resin was demonstrated. An increase in the water contact angle indicates a decrease in the surface energy of the coating. The results are given in Table 3.

TABLE 3

| Sample | Water Contact Angle (°) |
|---|---|
| PET without triblock resin | 59 |
| PET containing 1 wt. % PCL[1] | 65 |
| PET containing 1 wt. % PEA[2] | 62 |

[1]PCL = rosin/polycaprolactone tri-block resin
[2]PEA = rosin/poly(ethelene adipate) tri-block resin Having described various and preferred embodiments of the invention and the benefits and advantages thereof, it will be recognized by those of ordinary skill that variations of the specifically disclosed embodiments may be made and, indeed, other or improved embodiments may be made within the spirit and scope of the appended claims.

What is claimed is:

1. A paperboard container which comprises a first paperboard substrate area containing a first polymeric material layer, a second paperboard substrate area containing a second polymeric material layer which is dissimilar to the first polymeric material layer, and a thermally bonded joint between the first polymeric material layer and the second polymeric material layer, thereby connecting said first and second paperboard substrate areas together, said first polymeric material layer containing or having coated thereon from about 0.5 to about 10 wt. % of a tri-block resin of the structure

A—B—A formed by the reaction of an A-block material selected from the group consisting of fatty acids, rosin acids, alkyl phenols, and aryl and aliphatic alcohols with a B-block material selected from the group consisting of polyglycols, polyimines, polyesters, and polysulfides.

2. The container of claim 1 wherein the A-block and B-block materials reacted to form the A—B—A tri-block resin comprise a rosin acid and a polyethylene glycol, respectively.

3. The container of claim 1 wherein the A-block and B-block materials reacted to form the A—B—A tri-block resin comprise a rosin acid and polyethylene adipate diol, respectively.

4. The container of claim 1 wherein the A-block and B-block materials reacted to form the A—B—A tri-block resin comprise a rosin acid and polyethylene succinate diol, respectively.

5. The container of claim 1 wherein the A-block and B-block materials reacted to form the A—B—A tri-block resin comprise a fatty acid a B-block material selected from the group consisting of a polycaprolactone diol, a polyethylene adipate diol, and a polyethylene succinate diol, respectively.

6. A paperboard container which comprises a first paperboard substrate area containing a first polymeric material layer, a second paperboard substrate area containing a second polymeric material layer which is dissimilar to the first polymeric material layer, and a thermally bonded joint between the first polymeric material layer and the second polymeric material layer, thereby connecting said first and second paperboard substrate areas together, said first polymeric material layer containing or having coated thereon from about 0.5 to about 10 wt. % of a tri-block resin of the structure

A—B—A wherein the A—B—A tri-block resin is selected from the group consisting of rosin/polycaprolactone, rosin/poly (ethylene adipate), and rosin/poly(ethylene succinate) triblocks.

7. A paperboard container which comprises a first paperboard substrate area containing a first polymeric material layer, a second paperboard substrate area containing a second polymeric material layer which is dissimilar to the first polymeric material layer, and a thermally bonded joint between the first polymeric material layer and the second polymeric material layer, thereby connecting said first and second paperboard substrate areas together, said first polymeric material layer containing or having coated thereon from about 0.5 to about 10 wt. % of a tri-block resin of the structure

A—B—A formed by the reaction of an A-block material selected from the group consisting of fatty acids and rosin acids and a B-block material selected from telechelic diols.

8. The container of claim 1 wherein the first polymeric material comprises a polyolefinic material selected from polyethylene, polypropylene, polybutylene, and polystyrene.

9. The container of claim 8 wherein the polyolefinic material comprises low density polyethylene.

10. The container of claim 1 wherein the second polymeric material is selected from ethylene vinyl alcohol copolymer, glycol modified polyethylene terephthalate, and polycarbonate.

11. The container of claim 1 wherein the A—B—A resin is a compound of the formula $$RD\text{---}\left(\text{---}(CHR^2\{CH_2\}_pD^1)_r\text{---}\right)_s\text{---}R$$

wherein each is selected from the group consisting of alkyl, aryl, alkylaryl, acyl and arylacyl derivatives of an aliphatic or aliphatic/aromatic mono-acid with a molecular weight of from about 200 to about 500 daltons, each of $R^2$ and $R^3$ is selected from the group consisting of H, $CH_3$ and $C_2H_5$; each of D and $D^1$ is selected from the group consisting of O, —$NR^3$—, S and $CO_2$; each of n and p is and integer from 0 to 8, provided when p=0, n is greater than 0; each of m and r is an integer selected from 0 to 20, provided when r=0, m is greater than 0; and s is an integer from 2 to 20.

12. The container of claim 11 wherein D and $D^1$ are $CO_2$; $R^2$ is hydrogen; n is 5; m is 1, r is 0; and s is an integer from 5 to 12.

13. The container of claim 12 wherein s is 8.

14. The container of claim 13 wherein R is a rosin acid derivative.

15. The container of claim 11 wherein D and $D^1$ are $CO_2$; $R^2$ is hydrogen; m, n and r are 1; p is 3 and s is an integer from 5 to 12.

16. The container of claim 15 wherein s is 8.

17. The container of claim 15 wherein R is a rosin acid derivative.

18. The container of claim 11 wherein D and $D^1$ are $CO_2$; $R^2$ is hydrogen; m, n, p and r are 1; and s is an integer from 5 to 12.

19. The container of claim 18 wherein s is 8.

20. The container of claim 18 wherein R is a rosin acid derivative.

* * * * *

UNITED STATES PATENT AND TRADEMARK OFFICE
CERTIFICATE OF CORRECTION

PATENT NO. : 6,071,577
DATED : June 6, 2000
INVENTOR(S) : Eric S. Gardiner

Page 1 of 1

It is certified that error appears in the above-identified patent and that said Letters Patent is hereby corrected as shown below:

In the Specification:
Column 1,
Line 52, after "is", insert -- to --.

Column 3,
Line 39, after "greater", insert -- than --.

In the Claims:
Column 12, claim 11,
Line 10, delete the equation in its entirety and replace with:

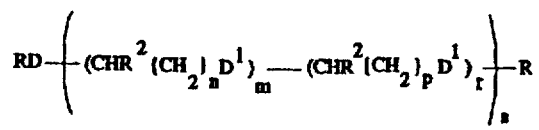

Line 13, after "each", insert -- R --.

Signed and Sealed this

Eighteenth Day of September, 2001

Attest:

*Nicholas P. Godici*

NICHOLAS P. GODICI
*Attesting Officer*   *Acting Director of the United States Patent and Trademark Office*